Figure 1B:
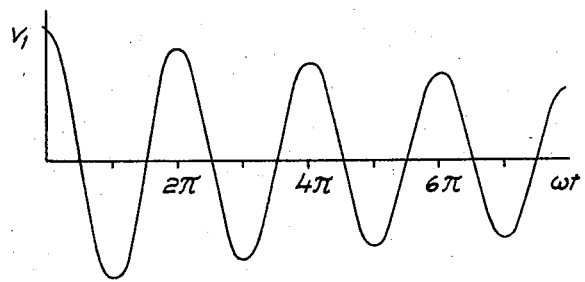
Figure 1B:
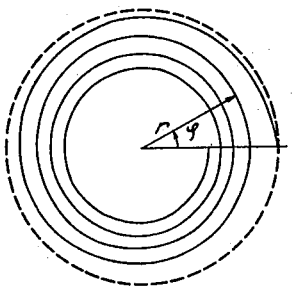

Dec. 2, 1958  C. O. OLSSON ET AL  2,863,116
METHOD AND APPARATUS FOR AUTOMATIC RECORDING OF THE LOGARITHMIC
DECREMENT AND THE FREQUENCY OF OSCILLATIONS WITH
INCREASING OR DECREASING AMPLITUDE
Filed Feb. 8, 1955  2 Sheets-Sheet 1

Fig.1.  $\alpha = 0.025$

Fig.1a.  $\alpha = 0.1$

Inventors
C. O. Olsson
K. Orlik-Rückemann
By Glascock Downing Reebel
Attys

Dec. 2, 1958         C. O. OLSSON ET AL         2,863,116
METHOD AND APPARATUS FOR AUTOMATIC RECORDING OF THE LOGARITHMIC
DECREMENT AND THE FREQUENCY OF OSCILLATIONS WITH
INCREASING OR DECREASING AMPLITUDE
Filed Feb. 8, 1955         2 Sheets-Sheet 2

Inventors
C. O. Olsson
K. Orlik-Rückemann

2,863,116

METHOD AND APPARATUS FOR AUTOMATIC RECORDING OF THE LOGARITHMIC DECREMENT AND THE FREQUENCY OF OSCILLATIONS WITH INCREASING OR DECREASING AMPLITUDE

Carl Olof Olsson, Sthlm-Vallingby, and Kazimierz Orlik-Rückemann, Hagersten, Sweden Application February 8, 1955, Serial No. 486,938

Claims priority, application Sweden February 22, 1954

5 Claims. (Cl. 324—78)

This invention relates to a method and an apparatus for automatic recording of the logarithmic decrement and the frequency of damped harmonic oscillations.

One of the usual methods to measure the damping of a mechanical or electrical linear system is to make this system to perform a series of decreasing oscillations and to determine the amplitude of these oscillations as a function of time. The logarithmic decrement and the frequency can thus be obtained and then the damping factor of the system can be determined. This method is fairly obvious but rather tedious. The precision of this method is not always so very satisfying depending on the great number of necessary operation steps. Thus there has for a long time been a great need of an apparatus, which can automatically record the logarithmic decrement and the frequency of oscillations.

The present invention shows a solution of this problem and is based on the idea of representing the harmonic damped oscillation by a rotary vector in such a way that the rate of change of the length of the vector is a measure of the damping of the oscillating system. The curve thus described by the end of the vector is a logarithmic spiral.

The oscillation to be investigated is introduced as a voltage to the four deflecting plates of the cathode-ray tube with a 90°-phase shift between successive plates. The voltage between one of the two pairs of opposite plates can be said to represent the potential energy of the oscillation, while the voltage between the other pair of plates represents the kinetic energy of the oscillation. The resulting deflection is approximately (if the damping is not too high) proportional to the square root of the total energy of the oscillation. Thus, if the damping is not too high, the screen of the cathode-ray tube can be said to represent the phase plane of the oscillation, i. e. a plane with instantaneous values of the amplitude of the oscillation and its time-derivative plotted in a Cartesian coordinate system. An apparatus using an exact phase plane representation can be easily constructed, but has been found to be less suitable for evaluating damping than the present one. The resulting deflection of the cathode-ray, i. e. the length of the radius vector to the spot on the screen, is proportional to the ordinate of the envelope of the oscillation.

The deflection can naturally also be produced magnetically, whereby the deflecting plates must be replaced by coils, the current in these coils then corresponding to the voltage fed to the deflecting plates.

Figure 1C:
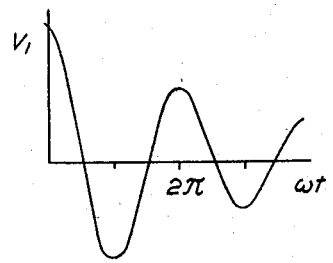
Figure 1C:
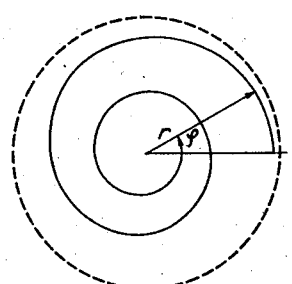
Figure 2:
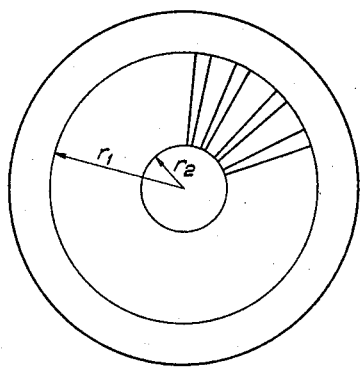
Figure 3:
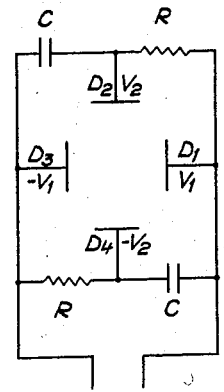
Figure 4:
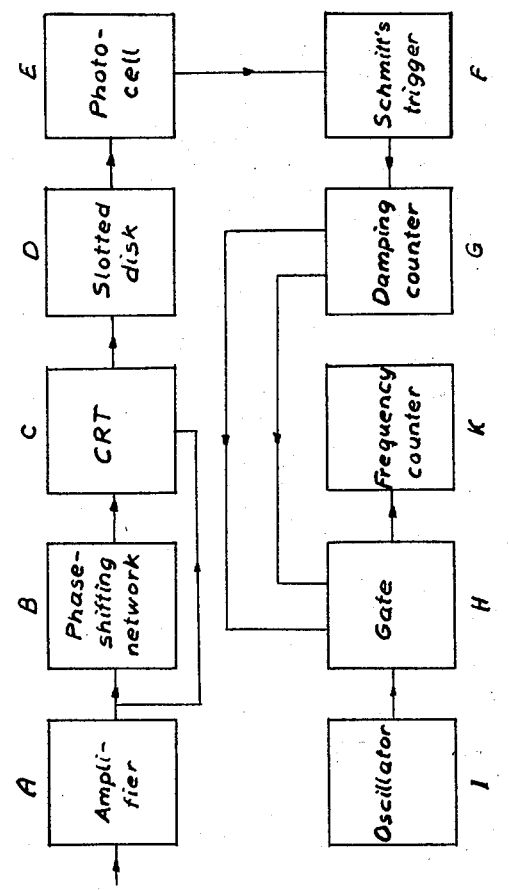

The invention will now be more clearly described in connection with the attached drawings, wherein Figs. 1 and 1a illustrate damped sinusoidal waveforms, and Figs. 1b and 1c illustrate, respectively, the corresponding traces on the cathode ray tube, Fig. 2 shows the slotted disk, Fig. 3 shows the arrangement in connection with the deflecting plates and Fig. 4 shows a block diagram of a preferred embodiment according to the present invention.

When the oscillation is damped the light spot, or electron beam, moves in a logarithmic spiral towards the centre of the screen, as shown in Fig. 1, each revolution thereof corresponding to an oscillation cycle.

The screen is covered by a circular disk provided with a number of equally spaced radial slots, all with the same length and placed at the same distance from the centre, as shown on Fig. 2. The spot moving along its spiral-shaped path passes the slots of the disk whereby light impulses are transmitted to an adjacent photocell. The number of pulses generated by the electron beam, when the length of the radius vector of the spiral decreases from the outer to the inner end of the slots, are registered on an electronic counter, which indicates the number directly in the decimal system. The logarithmic decrement of the oscillation is inversely proportional to this number. Another electronic counter is used for measuring the time during which a certain number of pulses occur, thus indicating the frequency of the oscillation.

For a better understanding of the invention the theories in connection with the invention will now be described. The circuit arrangement, which is used to provide the necessary phase shift between the plates $D_1$—$D_4$ in the cathode ray tube is shown in Fig. 3. The plates $D_1$ and $D_3$ are directly connected to the output of a push-pull amplifier. Thus, if the plate $D_1$ has the potential $+V_1$ the plate $D_3$ has the potential $-V_1$. In a similar manner the plates $D_2$ and $D_4$ have the potentials $V_2$ and $-V_2$, respectively. For the current $I$ between the plates $D_1$ and $D_3$ the following expression can be obtained $$\frac{dI}{dt}+\frac{I}{RC}=\frac{2}{R}\frac{dV}{dt}1 \qquad (1)$$

$$V_2=V_1-RI \qquad (2)$$

The general solution of Equation 1 is $$I=e^{-\frac{t}{RC}}\left(A+\int e^{+\frac{t}{RC}}\cdot\frac{2}{R}\frac{dV}{dt}1\cdot dt\right) \qquad (3)$$

where $A$ is a constant. In the case of decaying harmonic oscillation the incoming voltage may be written $$V_1=V_0 e^{-\alpha\omega t}\cdot\cos\omega t \qquad (4)$$

where $2\pi\alpha$ is the logarithmic decrement of the oscillation. Inserting into Equation 3 and integrating by parts, one obtains $$J=k\cdot e^{-\frac{t}{RC}}+\frac{2V_0\cdot e^{-\alpha\omega t}}{R\left[\left(\frac{1}{RC}-\alpha\omega\right)^2+\omega^2\right]}\cdot$$

$$\left[\left(\alpha^2\omega^2-\frac{\alpha\omega}{RC}+\omega^2\right)\cos\omega t-\frac{\omega}{RC}\sin\omega t\right] \qquad (5)$$

Taking the initial condition to be $I=0$ for $t=0$ the constant becomes $$k=-\frac{2V_0}{R}\frac{\left(\alpha^2\omega^2-\frac{\alpha\omega}{RC}+\omega^2\right)}{\left(\frac{1}{RC}-\alpha\omega\right)^2+\omega^2} \qquad (6)$$

Inserting Equations 4 and 5 into Equation 2, the voltage $V_2$ can be expressed as follows $$V_2 = 2V_0 e^{-\frac{t}{RC}} \cdot \frac{\alpha^2\omega^2 - \frac{\alpha\omega}{RC} + \omega^2}{\left(\frac{1}{RC} - \alpha\omega\right)^2 + \omega^2} - \frac{V_0 e^{-\alpha\omega t}}{\left(\frac{1}{RC} - \alpha\omega\right)^2 + \omega^2} \left[\left[\alpha^2\omega^2 + \omega^2 - \left(\frac{1}{RC}\right)^2\right] \cos \omega t - \frac{2\omega}{RC} \sin \omega t\right] \quad (7)$$

The distance of the cathode ray spot from the centre of the screen, i. e. the length $r$ of the radius vector, is then $$r = k_1(V_1^2 + V_2^2)^{\frac{1}{2}} \quad (8)$$

where $$\frac{k_1}{2}$$

is the deflection factor of the tube. The angle $\varphi$ of the radius vector measured from the direction $D_3 \to D_1$, is $$\phi = \operatorname{arctg} \frac{V_2}{V_1}$$

If the input $V_1$ is undamped ($\alpha=0$), the curve described by the spot approaches the following form since $$e^{-\frac{t}{RC}} \to 0$$

$$\begin{cases} r^2 = \dfrac{k_1^2 \cdot V_0^2}{\left[\omega^2 + \left(\frac{1}{RC}\right)^2\right]^2} \left\{2\left[\omega^4 + \left(\frac{1}{RC}\right)^4\right] \cos^2 \omega t + \dfrac{4\omega^2}{(RC)^2} \sin^2 \omega t - \dfrac{2\omega}{RC}\left[\omega^2 - \left(\frac{1}{RC}\right)^2\right] \sin 2\omega t\right\} \\[2ex] \varphi = \operatorname{arctg} \dfrac{\left[\left(\frac{1}{RC}\right)^2 - \omega^2\right] \cos \omega t + \dfrac{2\omega}{RC} \sin \omega t}{\left[\left(\frac{1}{RC}\right)^2 + \omega^2\right] \cos \omega t} \end{cases} \quad (9)$$

This curve becomes the circle $$r^2 = k_1^2 V_0^2$$

$$\varphi = \omega t$$

if R and C are adjusted so that $$RC = \frac{1}{\omega}$$

The apparatus allows a continuous adjustment of the product RC.

If the input $V_1$ is damped ($\alpha \neq 0$), the curve described by the cathode ray spot will be a spiral, which will in a sense have rotational symmetry when the product RC is adjusted according to $$RC = \frac{1}{\omega}$$

as will be assumed henceforward. Since the coefficients of $$e^{-\frac{t}{RC}} \text{ and of } e^{-\alpha\omega t}$$

in Equation 7 are of the same order of magnitude, it can be seen that after a short time the last term of Equation 7 will dominate if $\alpha \ll 1$, e. g.:

$$\alpha = 0.1 \quad t = \frac{2\pi}{\omega} \quad e^{-\frac{t}{RC}} = \frac{1}{284} e^{-\alpha\omega t}$$

$$\alpha = 0.2 \quad t = \frac{2\pi}{\omega} \quad e^{-\frac{t}{RC}} = \frac{1}{153} e^{-\alpha\omega t}$$

$$\alpha = 0.3 \quad t = \frac{2\pi}{\omega} \quad e^{-\frac{t}{RC}} = \frac{1}{82} e^{-\alpha\omega t}$$

This means that after one or two revolutions of the spot the term proportional to $e^{-t/RC}$ can be neglected. The amplification has to be chosen in such way that the spot makes one or two revolutions before entering the slots. Another way of eliminating the term $e^{-t/RC}$ is to start the oscillation by feeding energy into the system with the frequency $\omega$, thereby gradually approaching the starting amplitude at which the energy source abruptly is disconnected.

After setting $$RC = \frac{1}{\omega}$$

and neglecting the term proportional to $e^{-\omega t}$, the equation for the curve described by the spot becomes:

$$\begin{cases} r^2 = k_1^2 \cdot V_0^2 \cdot e^{-2\alpha\omega t} \left[\cos^2 \omega t + \dfrac{\sin^2 \omega t - \frac{1}{2}\alpha^2 \sin 2\omega t + \frac{1}{4}\alpha^4 \cos^2 \omega t}{\left(1 - \alpha^2 + \frac{1}{2}\alpha^2\right)^2}\right] \\[2ex] \varphi = \operatorname{arctg}\left(\dfrac{tg\omega t - \frac{1}{2}\alpha^2}{1 - \alpha + \frac{1}{2}\alpha^2}\right) \end{cases} \quad (10)$$

For $\alpha \ll 1$ this curve reduces to a logarithmic spiral $$\begin{cases} r = k_1 V_0 e^{-\alpha\omega t} \\ \varphi = \omega t \end{cases} \quad (11)$$

For higher values of $\alpha$ the spiral will be somewhat elongated in the direction of one pair of the plates. This can be eliminated by multiplying the voltage on plates $D_2$ and $D_4$ by the factor $$\left(1 - \alpha + \frac{1}{2}\alpha^2\right)$$

and for this purpose a special correction device can be used, calibrated directly in $\alpha$. Neglecting terms of order $\alpha^4$, the spiral then becomes $$\begin{cases} r^2 = k_1^2 V_0^2 e^{-2\alpha\omega t}\left(1 - \frac{1}{2}\alpha^2 \sin 2\omega t\right) \\ \varphi = \operatorname{arctg}\left(tg\omega t - \frac{1}{2}\alpha^2\right) \end{cases} \quad (12)$$

If $\alpha^2$ can be neglected, the curve will be the logarithmic spiral given by Equation 11. Higher values of $\alpha^2$ introduce an elongation of the spiral along an oblique axis passing through the centre of the screen and being symmetrically situated with respect to the plates $D_2$ and $D_3$. The angle $\Delta(\omega t)$, needed for the radius vector to decrease from a given value $r_1$, to another given value $r_2$, is a function of the angular position at which the radius vector is $r_1$ and $r_2$, respectively. The angle $\Delta(\omega t)$ is largest, when $$r = r_1 \text{ at } \omega t = \frac{\pi}{4} + m.\pi \text{ and } r = r_2 \text{ at } \omega t = \frac{3\pi}{4} + n.\pi$$

and lowest when it is the other way around. From an energy consideration it follows that $r$ cannot increase (if only $\alpha \gtrless 0$), i. e. a given value of $r$ can be passed only once. The angular position at which the length of the radius vector has a given value is difficult to control. The difference between the highest and the lowest value of $\Delta(\omega t)$, obtained for a given $\alpha$, is thus a measure of the maximum error due to elongation, that is $$|E(\omega t)| = \frac{1}{2}\{[\Delta(\omega t)]_{max} - [\Delta(\omega t)]_{min}\} = \frac{1}{\alpha}ln\left(1+\frac{1}{2}\alpha^2\right) \simeq \frac{1}{2}\alpha \quad (13)$$

As an example, $\alpha = 0.3$ gives an error of 8.6°.

The second expression of Equation 12 indicates a slight variable phase shift between $\varphi$ and $\omega t$. This phase shift is zero at $$\omega t = \frac{\pi}{2} + n.\pi$$

and maximum at $$tg\ \omega t = \frac{1}{4}\alpha^2$$

where it is:

$$(\omega t - \varphi)_{max} = arctg\ \frac{8\alpha^2}{16-\alpha^4} \quad (14)$$

For $\alpha = 0.3$ the maximum phase shift is 2.6°.

Since $\omega t$ is thus practically equal to $\varphi$, the error according to Equation 13 is the same whether the quantity measured is the angle $\Delta(\omega t)$ or the time $\Delta t$.

The arrangement according to the invention will consequently express a damped harmonic oscillation as a logarithmic spiral on the screen of the cathode ray tube. The length of the radius vector of the spot on the screen is proportional to the ordinate of the envelope $$V_1 = V_0 e^{-a\omega t}$$

of the harmonic oscillation. The higher the damping of the harmonic oscillation is, the faster the length of the radius vector decreases. If the screen is covered by a disk having $S$ radial slots, the outer and the inner radius of each of them being $r_1$ and $r_2$, respectively, then the logarithmic decrement, $\delta$, of the oscillation can be shown to be inversely proportional to the number of slot passages, $n$, between the outer and the inner radius. Denoting the time at which the spot enters the slots by $t_1$ and the time at which it leaves by $t_2$, the following expressions can be derived:

$$\left.\begin{array}{l}r_1 = k_1 V_0 e^{-a\omega t_1}\\ r_2 = k_1 V_0 e^{-a\omega t_2}\end{array}\right\} \therefore ln\left(\frac{r_1}{r_2}\right) = \alpha\omega(t_2-t_1) = 2\pi\alpha\frac{n}{s} = \delta\frac{n}{s}$$

$$\therefore \delta = 2\pi\alpha = \frac{s}{n}ln\left(\frac{r_1}{r_2}\right) \quad (15)$$

The number $n$ is registered by an electronic counter, damping counter, actuated by photocell. The number of slots, $s$, and the radius ratio $r_1/r_2$ can be chosen at will. In practice the radius ratio is determined by calibrating against a known input, and does not necessarily coincide with the geometrical ratio. The frequency of oscillation $\nu$ is measured using an oscillator of known frequency $\nu_{osc}$. A second electronic counter, the frequency counter, starts when the damping counter shows $n_1$ and stops when the damping counter shows $n_2$, and counts the numbers of periods $n_{osc}$ of the oscillator during that time. Hence the frequency of oscillation is determined by the relation $$\nu = \frac{n_2 - n_1}{s} \cdot \frac{\nu_{osc}}{n_{osc}} \quad (16)$$

The values of $n_2$, $n_1$ and $\mu_{osc}$ can be chosen within a suitable range.

The apparatus according to the invention will now be described in connection with Fig. 4. The oscillation to be investigated is fed to the plates of a cathode ray tube C via an amplifier A, both directly and via a phase shifting network B. Thus the electron beam in the tube is influenced and the light spot generated by the beam on the screen of the tube will describe a certain path, in this case a logarithmic spiral. The screen of the tube is covered by a disk D provided with a number of slots, the light spot thus influencing a photocell E, which in turn via a Schmitt S trigger circuit F, used as a pulse shaper, actuates an electronic counter, the damping counter G, which counts the pulses of circuit F thereby indicating the number of light impulses impinging upon photocell E. This counter then actuates a gate circuit H, which thus transmits oscillations from an RC-oscillator I having a predetermined frequency to a frequency counter K, said counter also emitting pulses, which block the gate circuit in order to prevent the pulses from passing to the frequency counter. In practice the pulses $n_1$ and $n_2$, which start and stop the frequency counter, must be selected in such a way, that the light spot is at a safe distance from the ends of the slots during the operation of the frequency counter. If the photocell misses one or more pulses during this time, which may happen if the light spot is near the outer or inner end of the slots, the time for the number $(n_2-n_1)$ pulses will be too long and the result in the frequency counter too high and thus a too small value of the frequency will be obtained.

It is possible to change the voltage on the different plate pairs for compensation of different deflection factors. The same arrangement is also used for correction in connection with the expression $$\left(1-\alpha+\frac{1}{2}\alpha^2\right)$$

which can be performed from the control panel of the instrument.

The frequency of the damped oscillation is measured by comparison with the frequency of an RC-oscillator. A frequency counter of exactly the same type as the damping counter counts the periods of the RC-oscillator between two selected pulses of the damping counter. These pulses may be selected within rather wide limits by aid of start-and-stop switches on the front panel in order to fit different damping ranges and different disks.

When using the apparatus according to the invention certain details must be adjusted. Thus the light spot must be adjusted so as to be as small and sharp as possible. The intensity must also be adjusted in order that the photocell and counter influenced thereby work regularly. The slotted disk must also be calibrated, but mainly when the disk is new and thereafter only very seldom. The number of slots is dependent upon the value of $\alpha$; if $\alpha$ is high the number of slots must be high, the limit being determined by the spot diameter and the speed of the damping counter. If $\omega$ is high and if many slots are used the number on the frequency counter will be low and in this case it might be preferable to use only a few slots. Therefore a number of different slotted disks must be used to obtain a reasonable accuracy for both $\alpha$ and $\omega$. The shape of the disk may naturally be modified; of importance is the measuring of the angle of the vector between two amplitude values. Instead of slots the disk may have a ringshaped opening in place of the slotted area; the electron beam in this case being intensity modulated in such a way that a dotted spiral is obtained.

The present apparatus for automatic evaluation of damped oscillations, can be used with good accuracy ($< 2\%$) for a logarithmic decrement absolutely smaller than 2 in the frequency range 0.5–500 C. P. S. For higher absolute values of the logarithmic decrement the accuracy decreases. The apparatus provides the results simultaneously with the oscillation test. Thus several tests can be performed and evaluated in a short time to give a representative mean value.

The range and the accuracy of the apparatus according to the invention can be increased by using a larger cathode ray tube, faster counters, higher radius ratio and larger number of slots. Thus the principle can be adopted up to frequencies in the order of magnitude of 1M C. P. S., if damping is not too high, which makes the apparatus useful for a number of widely different research fields.

We claim:

1. Apparatus for indicating the logarithmic decrement and the frequency of an amplitude varying oscillation comprising, a cathode ray tube having a pair of vertical and a pair of horizontal deflection plates, input circuit means including an amplifier and a phase shifting network for discretely feeding an amplitude varying oscillatory input signal to said plates thereby developing a spirally shaped trace on the screen of said cathode ray tube, a disk conformingly disposed on said screen and being adapted to cyclically interrupt said trace, means including a photo cell operatively disposed to said screen for developing electrical impulses upon impingement of said interrupted trace upon said photo cell, a first electronic counter connected to said last mentioned means and being actuable in response to said developed impulses, a source of oscillations of a predetermined frequency, a second electronic counter being actuable by said source, and a gating circuit interconnecting said source and said second counter for effecting actuation of said second counter by said source upon actuation of said first counter.

2. Apparatus according to claim 1 wherein said cathode ray tube further includes means for adjusting the potential of said input signal upon one pair of said deflection plates.

3. Apparatus according to claim 1 wherein said disk includes a plurality of equidistant radial slots of identical size for effecting the cyclical interruption of said trace.

4. Apparatus according to claim 1 wherein said disk includes a ring-shaped aperture, and said cathode ray tube includes means for effecting intensity modulation of said trace.

5. A system for indicating the logarithmic decrement and the frequency of a damped oscillatory signal comprising, a cathode ray tube having a pair of vertical and a pair of horizontal deflection plates, input circuit means including an amplifier and a phase shifting network connected to said pairs of plates for feeding a damped oscillatory signal thereto thereby developing a spirally shaped trace on the screen of said tube, said trace having a radius length proportional to the envelope amplitude of said signal, a disk conformingly disposed on said screen and having a plurality of equidistant radial slots of identical size formed thereon for cyclically interrupting the emanations of said trace, means including a photo cell exposed to said screen for producing electrical impulses correlative to said interrupted trace emanations, a first electronic counter actuable in response to said electrical impulses for indicating the number of said interrupted trace emanations, an oscillatory signal source of a predetermined frequency, a second electronic counter actuable by said source, and a gating circuit interconnecting said source and said second counter for effecting actuation of said second counter by said source upon actuation of said first counter.

References Cited in the file of this patent
UNITED STATES PATENTS

| | | |
|---|---|---|
| 2,403,983 | Koenig | July 16, 1946 |
| 2,605,332 | Parsons | July 29, 1952 |